(12) United States Patent
Lustenberger

(10) Patent No.: US 9,421,707 B2
(45) Date of Patent: *Aug. 23, 2016

(54) NANOFIBER FILTERING MATERIAL FOR DISPOSABLE/REUSABLE RESPIRATORS

(71) Applicant: Honeywell International Inc., Morristown, NJ (US)

(72) Inventor: Francois Lustenberger, Cotes d'Armor (FR)

(73) Assignee: Honeywell International Inc., Morris Plains, NJ (US)

( * ) Notice: Subject to any disclaimer, the term of this patent is extended or adjusted under 35 U.S.C. 154(b) by 634 days.

This patent is subject to a terminal disclaimer.

(21) Appl. No.: 13/645,645

(22) Filed: Oct. 5, 2012

(65) Prior Publication Data

US 2014/0097558 A1    Apr. 10, 2014

(51) Int. Cl.
*B29C 47/02* (2006.01)
*B29C 47/08* (2006.01)
*B29C 47/00* (2006.01)
(Continued)

(52) U.S. Cl.
CPC ............ *B29C 47/08* (2013.01); *B29C 47/0002* (2013.01); *B29C 47/004* (2013.01); *B29C 47/0059* (2013.01); *B29C 47/0066* (2013.01); *B29C 47/54* (2013.01); *B29C 51/00* (2013.01); *D04H 1/728* (2013.01); *A62B 23/02* (2013.01); *A62B 23/025* (2013.01); *B29C 2947/92704* (2013.01)

(58) Field of Classification Search
CPC ... A62B 23/025; A62B 23/02; B29C 47/0076
USPC ........... 264/433, 452, 465, 484; 425/174.8 E; 128/206.19
See application file for complete search history.

(56) References Cited

U.S. PATENT DOCUMENTS 692,631 A    2/1902  Cooley
4,726,365 A  2/1988  Jablonski
(Continued)

FOREIGN PATENT DOCUMENTS

CN    203295674 U    11/2013
CN    203467710 U    3/2014
(Continued)

OTHER PUBLICATIONS

Vonch, "Electrospinning: A Study in the Formation of Nanofibers", 2007.*
(Continued)

*Primary Examiner* — Alison L Hindenlang
*Assistant Examiner* — Lawrence D Hohenbrink, Jr.
(74) *Attorney, Agent, or Firm* — Conley Rose, P.C.; Kristin Jordan Harkins

(57) ABSTRACT

Embodiments relate generally to methods of manufacture of a filtration media, such as a personal protection equipment mask or respirator, which may incorporate an electrospinning process to form nanofibers. Some embodiments may comprise electrospinning material onto a convex mold, which may, for example, be in the shape of a human face. Other embodiments may comprise electrospinning material onto an inner and/or outer shell of a personal protective equipment mask, such as a flat fold mask. In an embodiment, the electrospun nanofibers may be functionalized, and therefore may, for example, be operable to capture one or more gases.

19 Claims, 5 Drawing Sheets

(51) Int. Cl.
*B29C 47/54* (2006.01)
*B29C 51/00* (2006.01)
*D04H 1/728* (2012.01)
*A62B 23/02* (2006.01)

(56) References Cited

U.S. PATENT DOCUMENTS

| | | | |
|---|---|---|---|
| 6,102,039 A * | 8/2000 | Springett | A41D 13/1146 |
| | | | 128/206.12 |
| 7,332,050 B2 | 2/2008 | Kim | |
| 7,789,930 B2 | 9/2010 | Ensor et al. | |
| 8,308,834 B2 | 11/2012 | Smithies et al. | |
| 2008/0110342 A1 * | 5/2008 | Ensor | B01D 39/1623 |
| | | | 96/54 |
| 2008/0264259 A1 | 10/2008 | Leung | |
| 2009/0107495 A1 | 4/2009 | Ni et al. | |
| 2010/0031617 A1 | 2/2010 | Ensor et al. | |
| 2010/0050872 A1 * | 3/2010 | Lee | B01D 39/2031 |
| | | | 95/279 |
| 2010/0051031 A1 * | 3/2010 | Lustenberger | A62B 18/025 |
| | | | 128/206.19 |
| 2011/0214487 A1 | 9/2011 | Olesik et al. | |
| 2011/0232653 A1 | 9/2011 | Imashiro et al. | |
| 2012/0077404 A1 * | 3/2012 | Scrivens | B32B 5/022 |
| | | | 442/344 |
| 2012/0222679 A1 * | 9/2012 | Angadjivand | A62B 23/025 |
| | | | 128/206.12 |
| 2014/0159263 A1 | 6/2014 | Lozano et al. | |
| 2014/0250846 A1 | 9/2014 | Walls et al. | |

FOREIGN PATENT DOCUMENTS

| | | |
|---|---|---|
| CN | 103726224 A | 4/2014 |
| EP | 161068 A1 | 7/2006 |
| FR | 2903610 A1 | 1/2008 |
| IN | 2014DE00204 | 1/2014 |
| JP | 2012143618 A | 8/2012 |
| WO | 2010120730 A1 | 10/2010 |
| WO | 2010127634 A1 | 11/2010 |
| WO | 2012097762 A1 | 7/2012 |
| WO | 2014089458 A1 | 6/2014 |
| WO | 2014127099 A1 | 8/2014 |
| WO | 2014143039 A1 | 9/2014 |

OTHER PUBLICATIONS

Han, "Coaxial Electrospinning of PC(Shell)/PU(Core) Composite Nanofibers for Textile Application", 2006.*
Conrado, "Reduction in Body Measurements After Use of a Garment Made with Synthetic Fibers Embedded with Ceramic Nanoparticles", 2011.*
Sarkar, "Electrospinning to ForcespinningTM", 2010.*
Vonch et al., "Electrospinning: A Study in the Formation of Nanofibers", 2007.*
Han, "Coaxial Electrospinning of PC(Shell)/PU(Core) Composite Nanofibers for Textile Application", 2006.*
Conrado, "Reduction in Body Measuements After Use of a Garment Made with Synthetic Fibers Embedded with Ceramic Nanoparticles", 2011.*
Sarkar, "Electrospinnign to Forcespinning TM", 2010.*
Lim et al., "A Review of Spun Bond Process", Journal of Textile and Apparel, Technology and Management, vol. 6, Issue 3, Spring 2010.*
Huang et al.; "A Review on Polymer Nanofibers by Electrospinning and Their Applications in Nanocomposites"; Elsevier Composites Science and Technology, www.sciencedirect.com, pp. 2223-2253, Nov. 2003.
"Nanofiber Filter Technology"; RTI International; Research Paper, Michele Ostraat, PhD, Senior Director, Center for Aerosol and Nanomaterials Engineering, 2 pages.
http://www.tradeindia.com/selloffer/2762280/Anygreen-Nano-Fiber-Filter-Face-Mask.html; Sambo Saewoon Sale Co., Ltd., May 17, 2012, pp. 1-5.
Huang et al.; "A Review on Polymer Nanofibers by Electrospinning and Their Applications in Nanocomposites"; Elsevier Composites Science and Technology, www.sciencedirect.com, pp. 2223-2253.
PCT/US2013/060516, PCT International Search Report, dated Dec. 23, 2013, 3 pages.
PCT/US2013/060516, PCT Written Opinion of the International Searching Authority, dated Dec. 23, 2013, 6 pages.
Sarkar et al. "Electrospinning to ForcespinningTM", Materials Today, vol. 13, No. 11, Nov. 2010.
US Office Action for U.S. Appl. No. 14/615,232 dated Sep. 24, 2015, 19 pages.
EP Patent Application No. 13843427.9, Extended European Search Reprot, mailed May 17, 2016, 11 pages.

* cited by examiner

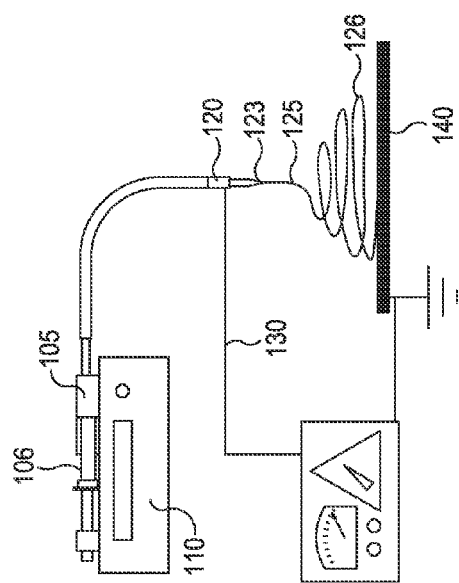
FIG. 1 - Prior Art
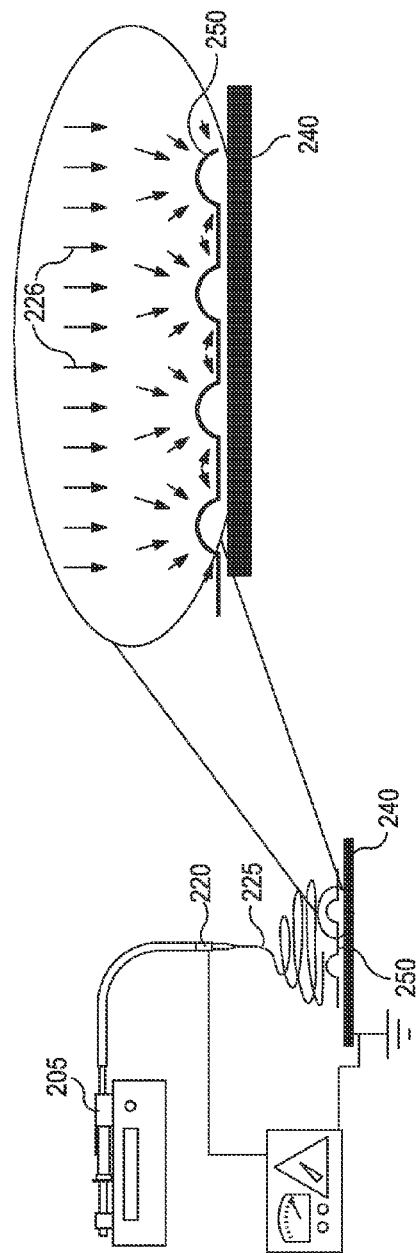
FIG. 2

US 9,421,707 B2

NANOFIBER FILTERING MATERIAL FOR DISPOSABLE/REUSABLE RESPIRATORS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Personal protection equipment (PPE), specifically disposable masks, may be required to conform to certain regulations during design and manufacture. The user's ability and ease of breathing while wearing the mask may be considered, as well as the fit and the comfort of the user who may wear the mask. Because of the disposable nature of the mask, a low cost manufacturing process may be desired. Certain regulatory standards may need to be met, such as EN149:2001 for Europe or 42 CFR part 84 for US or ISO 17420. PPE under these regulations are class III products according to PPE directive in Europe or other parts of the world. PPE, such as disposable masks or reusable cartridges, may comprise filtration media, which may be made of melt-blown fibers and/or micro glass material. Filtration by a mask is accomplished when particles in the air are trapped in the matrix of the fibers contained in the filtration media of the mask.

SUMMARY

Aspects of the disclosure may include embodiments of a method of manufacturing a personal protection equipment mask, comprising: providing a stock of polymer material; creating nanofibers from the stock polymer material to form a nanofiber material; placing the nanofiber material onto a convex mold; cutting the nanofiber material to the shape of a personal protection equipment mask; and attaching retaining straps to the personal protection equipment mask. In an embodiment, creating the nanofibers and placing the nanofiber material may comprise electrospinning the polymer material onto the convex mold. In an embodiment, the convex mold comprises the shape of one or more of: a spherical cap with a spherical base, a spherical cap with an ovoid base, or a human face. In an embodiment, the nanofiber material of the personal protection equipment mask may be functionalized to remove gas, wherein the nanofiber material of the personal protection equipment mask may be functionalized to remove at least some volatile organic chemicals (VOCs) and acid vapors. In an embodiment the nanofiber material of the personal protection equipment mask may be functionalized to remove at least one of: nitrogen monoxide (NO), nitrogen dioxide ($NO_2$), ozone ($O_3$), hydrogen cyanide (HCN), arsine ($AsH_3$), hydrogen fluoride (HF), chlorine dioxide ($ClO_2$), ethylene oxide ($C_2H_4O$), formaldehyde ($CH_2O$), methyl bromide ($CH_3Br$), and phosphine ($PH_3$). In an embodiment, providing the stock of polymer material may comprise providing the stock of polymer material mixed with functionalizing material.

Additional aspects of the disclosure may include embodiments of a method of manufacturing a personal protection equipment mask, comprising: thermoforming outer and inner shells of a personal protection equipment mask; electrospinning a polymer material as nanofibers onto the inner shell; coupling the outer shell to the inner shell having the nanofibers to form the personal protection equipment mask; cutting the personal protection equipment mask to shape; and attaching retaining straps to the personal protection equipment mask. In an embodiment, the method may further comprise electrospinning a polymer material as nanofibers onto the outer shell. In an embodiment the nanofibers may be less than about 1000 nanometers in diameter. In an embodiment, the nanofibers may be functionalized to remove gas, wherein the nanofibers may be functionalized with at least one of a biocide, a virucide, or a bactericide. In an embodiment, the personal protection equipment mask is a flat fold mask.

Other aspects of the disclosure may include embodiments of a method of manufacturing a personal protection equipment mask, comprising: electrospinning a material as nanofibers to form at least a portion of a personal protection equipment mask, wherein the nanofibers may be functionalized to remove gas; cutting the personal protection equipment mask to shape; and attaching retaining straps to the personal protection equipment mask. In an embodiment, the material that is electrospun into nanofibers may comprise a polymer and one or more functionalizing materials. In an embodiment the one or more functionalizing materials may be one or more chemicals that capture one or more of volatile organic chemicals (VOCs), acid vapors, or $CO_2$. In an embodiment, the one or more functionalizing materials may be one or more of a biocide, a virucide, or a bactericide. In an embodiment, the material may be a homogenous mix of the polymer and the functionalizing materials. In an embodiment, the material may comprise the functionalizing materials emulsified in the polymer. In an embodiment, the material may be electrospun using a co-axial electrospinning process.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 1 illustrates an embodiment of one way to manufacture nanofibers with an electrospinning process;

FIG. 2 illustrates an embodiment of an electrospinning process where the target comprises a molded form;

DETAILED DESCRIPTION

Figure 3:
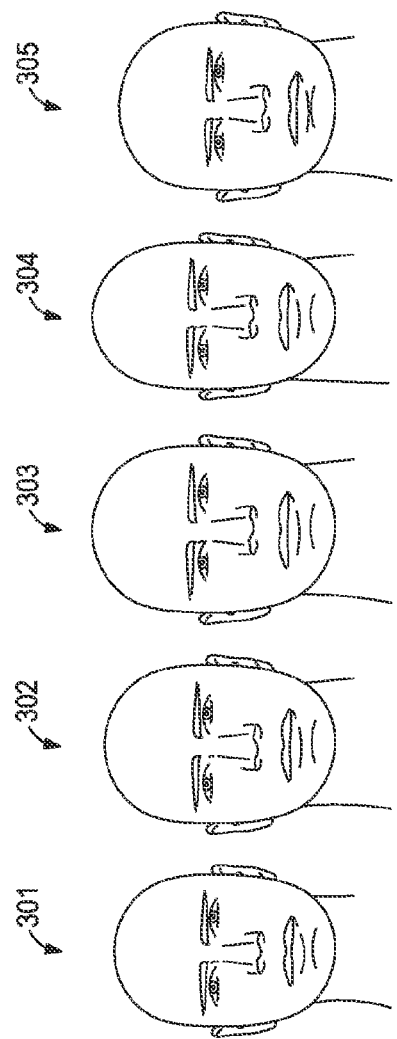
FIG. 3 illustrates exemplary human face shapes that may be used as a molded form.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments relate generally to methods for incorporating the use of electrospinning technology to form filtration media made of nanofibers into the manufacture of personal protective equipment (PPE) (for example, disposable/reusable respirators and/or masks). More specifically, the filtration media may be used in Class III PPE, which may, for example, be regulated by standards such as EN149-42 CFR Part 84. Typical disposable and/or reusable filters for respirators may be constructed of melt-blown material, usually melt-blown nanofibers. Additionally, an electrical charge may typically be applied to the fibers to capture smaller particles in the air and provide a higher level of respiratory protection, for example to meet certain EN or US standards. However, the effect of the electrical charge may be time sensitive, causing the filter material to have a limited storage capability or "shelf-life" (i.e. how long the filter media may be stored and still retain necessary filtering capabilities, which may for example be a maximum of 5 years). Applicant has proposed methods for the manufacture of filter material from nanofibers using electrospinning technology that may not require the filter material to be electrically charged, and therefore may eliminate the constraints of a shelf-life for the material. This may be accomplished by relying only on the mechanical properties of the filter media to perform filtration rather than electrical properties. Further, Applicant has developed methods for integrating the production of nanofibers using electrospinning into a manufacturing process for a filter material (for example, a mask or respirator filter). Additionally, Applicant has developed methods of functionalizing nanofibers (to capture specific gases, for example) which may allow for additional applications of a filtration media. Embodiments may also relate to other aspects of a PPE mask, such as fit to the face of a user, air leakage through the filter media, etc. For example, an embodiment of the disclosure may use nanofibers (which may be functionalized) to improve breathing resistance, solid or liquid aerosol penetration, as well as fit and comfort of the respirators.

Referring to FIG. 1, an exemplary electrospinning process (as would be understood by persons of ordinary skill in the art) may typically involve the use of an electrical charge to draw very fine fibers from a liquid. In an embodiment, a liquid solution 105 may be contained in a syringe 106 which may be controlled by a syringe pump 110. The syringe pump 110 may drive the solution 105 to an opening in a needle 120, where the solution 105 may form a liquid droplet 123 at the tip of the needle 120. In an embodiment, the solution 105 may comprise a polymer material, wherein the polymer material may comprise polylactic acid (PLA) which may be diluted in a water solvent. In an alternative embodiment, the polymer material may comprise polyamide (PA) 6.6 diluted in a solvent which may comprise about ⅓ formic acid and about ⅔ acetic acid. A voltage 130 may be applied between the liquid droplet 123 and a grounded target 140 held at ground, causing the body of the liquid solution 105 to become charged and form a liquid jet 125. The liquid jet 125 may then be elongated by a whipping process and may typically dry in flight to form solid fibers 126 which may then collect on the grounded target 140. The fibers 126 that collect on the grounded target 140 may typically comprise nanofibers (i.e. fibers that are less than about 1000 nanometers in diameter).

Referring now to FIG. 2, in an embodiment, a molded form 250 may be located on the grounded target 240, where the fibers 226 may collect on the surface of the molded form 250 and may form a layer of filtration media on the molded form 250. In an embodiment, the molded form 250 may be convex and may be in the shape of a mask, a shell, a plate or any other form operable to receive electrospun nanofibers 226. In an embodiment, the molded form 250 may comprise a shape of a human face. In an embodiment the convex molded form 250 may comprise the shape of a spherical cap with a spherical or ovoid base. Additionally, the molded form 250 may comprise a plastic material such as polypropylene or polyethylene.

As shown in FIG. 3, the shape of a human face used as a mold may, for example, comprise one of the five standard shapes listed in the PCA Panel according to anthropometric studies and ISO 17420. These different face shapes may include Small 301, Medium 302, Large 303, Long/Narrow 304, and Short/Wide 305, and according to anthropometric studies, these five standard face shapes may encompass the 5 to 95 percentiles of human face shapes. In an embodiment, the nanofibers 226 may be electrospun directly onto the convex mold (which may, for example, be in the shape of a human face) wherein the nanofibers may adhere to (and possibly take the shape of) the contours of the shape of the mold.

Figure 4:
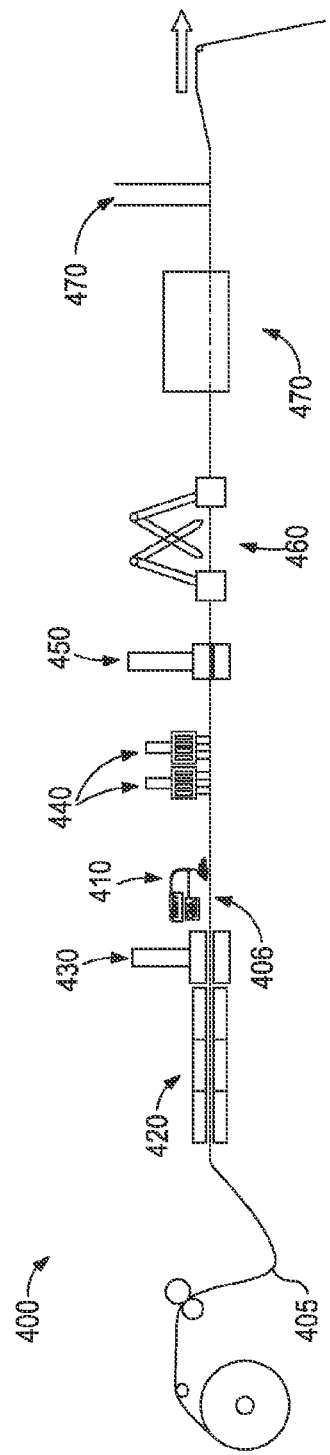
FIG. 4 illustrates a method of manufacturing a PPE mask which incorporates an electrospinning process.

Methods disclosed herein may comprise integrating electrospinning into an automatic line process for the manufacture of a mask or other filtration media. In the embodiment of FIG. 4, a process 400 for manufacturing a molded mask is shown which may comprise manufacturing filtering media 410 using electrospinning. In an alternative embodiment, the filter media may be manufactured using another method of creating nanofibers. An embodiment of the process 400 may comprise feeding a moldable material 405 through ovens 420 (operable to heat the material 405) and then through a thermoforming press 430, which may create a molded form 406. In an embodiment, the molded form 406 may comprise the shape of a human face (as shown in FIG. 3), and in other embodiments the molded form may comprise another shape, such as that of a respirator mask and/or filter cartridge. The molded form 406 may then be fed through the manufacturing of filtering media 410 where (as shown in FIG. 2 above) nanofibers may be electrospun onto the molded form 406 to form a filtering media layer on the molded form 406. In an embodiment, the process may comprise welding 440 the filtering media to the molded form 406. The filtering media and/or the molded form 406 may then be cut using a cutting press 450 into the shape of a PPE mask. In an embodiment, the process may additionally comprise removing the nanofiber filtering media from the molded form 406, while in other embodiments, the filtering media may remain attached to the molded form 406. In an embodiment, the filtering media may be attached to a cover layer, which may provide structural support and protect the filtering media from damage, wherein the cover layer would comprise a part of the finished mask formed by the filtering media. In an embodiment, the molded form 406 described above may be equivalent to the cover layer, wherein the molded form 406 (or cover layer) may comprise a plastic material such as polypropylene or polyethylene. Elastic retaining straps (operable to hold the mask onto the head of a user) may be attached to the body of the PPE mask using stapling and/or welding 460. The finished PPE mask may be visually inspected using a camera control system 470 to ensure the quality of the PPE masks and possibly to detect defects.

Figure 5:
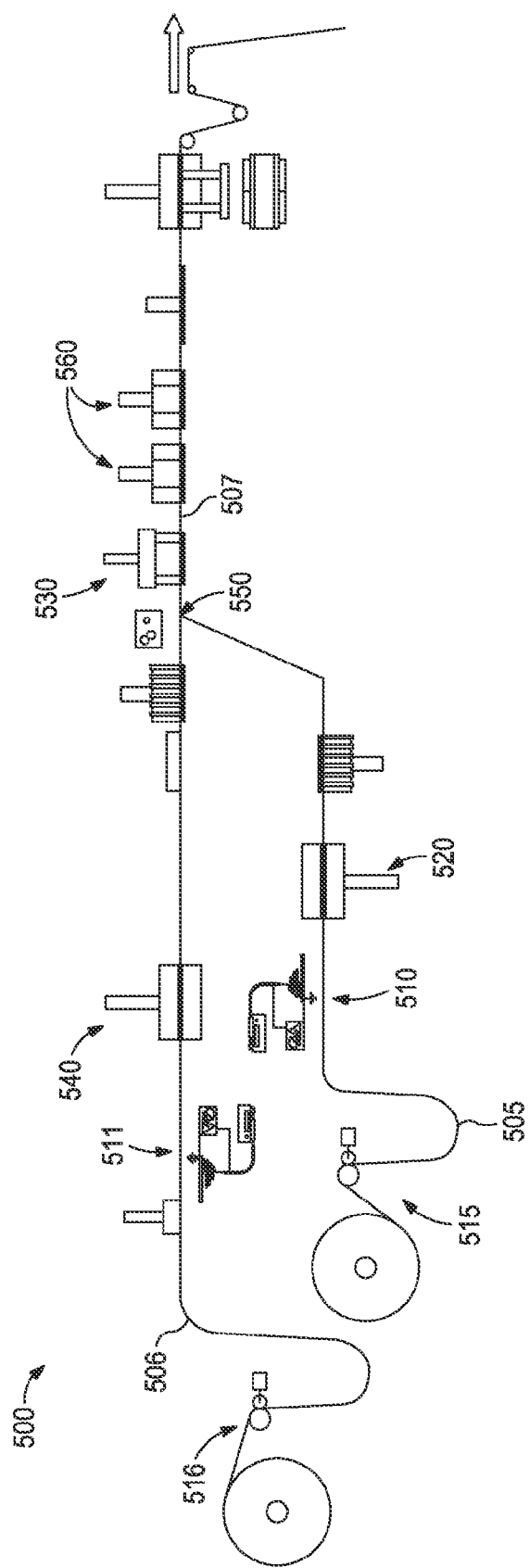
FIG. 5 illustrates another method of manufacturing a PPE mask which incorporates an electrospinning process.

As shown in FIG. 5, another embodiment of a method of manufacturing a PPE mask may comprise unwinding 515 a lower part 505 (which may also be referred to as an inner shell), wherein the lower part 505 may comprise a moldable material, and may feed through the process 500. Another step may comprise electrospinning 510 a polymer material in the form of nanofibers onto the surface of the lower part 505 (as shown in the embodiment of FIG. 2). The process 500 may further comprise cutting 520 the lower part 505 to a shape (which may for example be the shape of a PPE mask, such as a flat fold mask) wherein the cutting may allow for folding of the mask, especially at the nose and chin area.

In an embodiment, the method may further comprise unwinding 516 an upper part 506 (which may also be referred to as an outer shell), wherein the upper part 506 may comprise a moldable material, and feed through the process 500. In an embodiment, the upper part 506 may also be known as a cover layer and may comprise a spunbond material. In an embodiment, the process 500 may optionally comprise electrospinning 511 a polymer material (which may be similar or different to the polymer material electrospun at step 510) in the form of nanofibers onto a surface of the upper part 506 (which may for example be the inner surface of the upper part). The upper part 506 may be cut 540 to form a shape that may correspond to the shape of the lower part 505, where, in an embodiment, the upper part 506 may be coupled 550 to the lower part 505 having electrospun nanofibers on its surface, and where, in an embodiment, the nanofiber layer might be located between the upper part 506 and lower part 505. In an embodiment, the method may further comprise attaching elastic retaining straps 530 (which may be operable to hold a PPE mask against the face of a user) to the shape 507 formed by the coupled upper and lower parts. The coupled upper and lower parts may additionally be welded together 560 at their perimeter. In an embodiment, the product may undergo further processing to complete the manufacture of a flat fold (or molded) mask, wherein additional steps may occur prior to or after any of the steps described above. In an embodiment, an additional step may comprise adding a partial or full face seal to the mask.

Figure 6A:
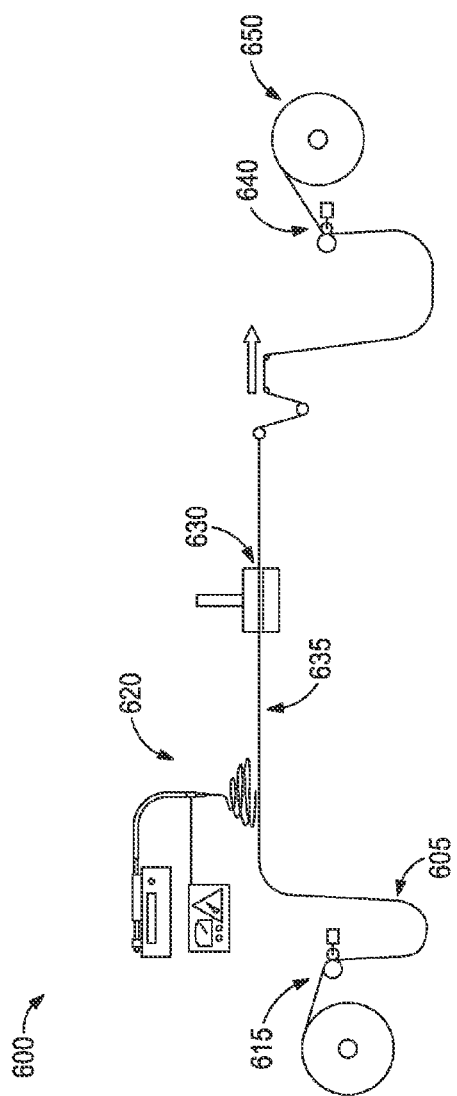
FIGS. 6A-6B illustrate methods of manufacturing filter material, such as rolled media and pleated media, which incorporate an electrospinning process.
Figure 6B:
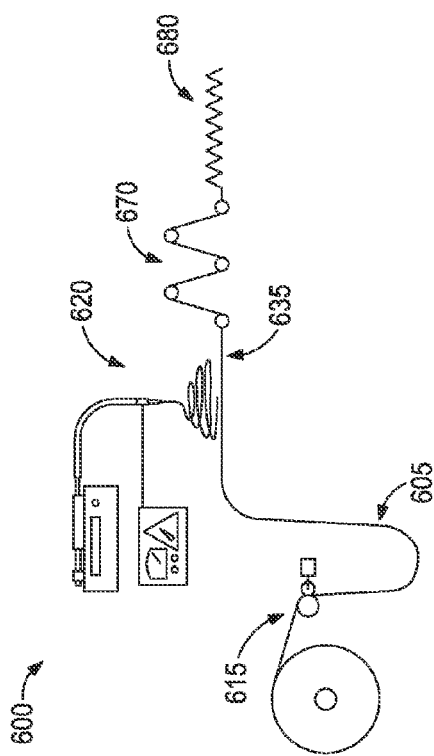

In the embodiments of FIGS. 6A-6B, a method may comprise manufacturing a disposable/reusable filter material other than a mask, such as a rolled media or pleated media (which may for example be used to make a cartridge for a respirator or other air purification device). As shown in the embodiment of FIG. 6A, a manufacturing process 600 may comprise unwinding 615 a material 605 and feeding the material 605 through the process 600. An embodiment of the process 600 may comprise electrospinning 620 filter media as nanofibers onto the material 605. In alternative embodiment, nanofibers may be electrospun to form a thin layer of filtration media that may then be attached (possibly by welding) to the material 605 (which may for example form a shell of a mask). The process 600 may further comprise cutting 630 the finished material 635 (where the finished material 635 may comprise the material 605 and electrospun filter media). After cutting, the finished material 635 may be wound 640 onto a roll to form a rolled filter material 650. In an alternative embodiment shown in FIG. 6B, a method may comprise the finished material 635 being pleated 670 to form a pleated filter material 680. In an embodiment, the height of the pleats created in step 670 may be between about 3 mm to about 40 mm depending on the desired use of the pleated material and/or the hazardous environment. In an embodiment, the pleated filter material 680 might also be cut to specified dimensions based on the specific product that is being manufactured.

In an embodiment, a method of manufacturing a PPE mask may comprise electrospinning a material as nanofibers to form at least a portion of a PPE mask, wherein the nanofibers may be functionalized to remove one or more gases/vapors. Shown in the embodiments of FIGS. 7A-7D, nanofibers formed by electrospinning a polymer solution may be functionalized by the addition of another material to the polymer solution. The additional functionalizing material may be operable to remove gases and may comprise one or more chemicals that may capture gases (where the gases might be volatile organic chemicals (VOCs), acid vapors, carbon dioxide ($CO_2$), nitrogen monoxide (NO), nitrogen dioxide ($NO_2$), ozone ($O_3$), hydrogen cyanide (HCN), arsine ($AsH_3$), hydrogen fluoride (HF), chlorine dioxide ($ClO_2$), ethylene oxide ($C_2H_4O$), formaldehyde ($CH_2O$), methyl bromide ($CH_3Br$), and/or phosphine ($PH_3$)). In an embodiment, the functionalized material may comprise one of a biocide (i.e. a chemical substance or microorganism which can deter, render harmless, or exert a controlling effect on any harmful organism by chemical or biological means), a virucide (i.e. a physical or chemical agent that deactivates or destroys viruses) and/or a bactericide (i.e. a substance that kills bacteria, for example disinfectants, antiseptics, or antibiotics). In other embodiments, a functionalized nanofiber may be operable to remove humidity, control temperature, indicate end of service life, indicate clogged material, and/or provide a fresh odor inside the mask.

Figure 7B:
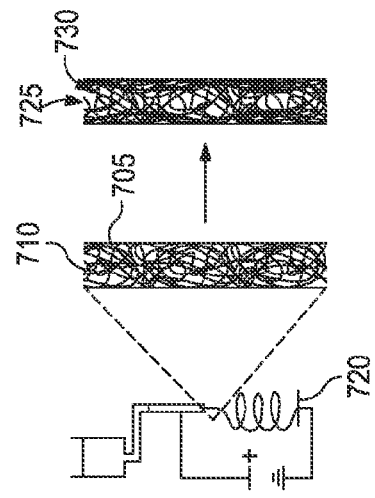
FIGS. 7A-7D illustrate embodiments of methods for functionalizing an electrospun material.
Figure 7D:
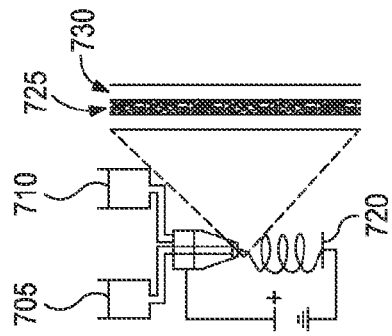
Figure 7A:
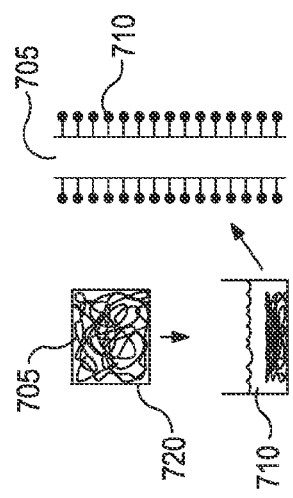
Figure 7C:
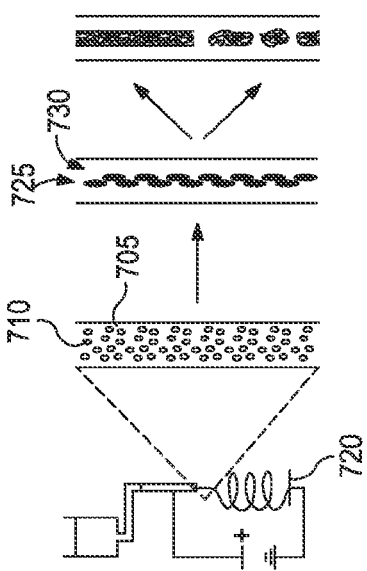

Exemplary embodiments of methods for functionalizing electrospun nanofibers are shown in FIGS. 7A-7D. In the embodiments, the material that is functionalized and electrospun onto a target may be operable to capture molecules in the air (because of the surface area of the nanofibers) as well as remove gases from the air (such as those captured by the functionalizing material, as listed above). In the embodiment of FIG. 7A, functionalization of a nanofiber material may be accomplished with surface functionalization, where the material 705 (such as a polymer solution) may have already been electrospun onto a target 720. The functionalizing material 710 may be introduced and may adhere to the surface of the electrospun material 705, for example by soaking the electrospun material 705 in and/or by spraying on the functionalizing material 710. In the embodiment of FIG. 7B, a functionalizing material 710 may be blended with another material 705 (such as a polymer solution) to form a homogenous mixture prior to electrospinning. Then, the blended mixture containing both the functionalizing material 710 and the polymer solution 705 may be electrospun onto a target 720 (such as in any of the methods disclosed above) forming nanofibers which may comprise both the polymer material and the functionalizing material. In an embodiment, during electrospinning, one material might migrate towards the outer surface of the fiber 730 while the other material may migrate towards the center of the fiber 725. In another embodiment shown in FIG. 7C, a functionalizing material 710 may be dispersed in a polymer solution 705 (or vice versa, where the polymer solution may be dispersed in a functionalizing material) to form a heterogeneous emulsion mixture. The emulsion may then be electrospun onto a target 720, where during electrospinning, one of the emulsified materials may migrate towards the center of the fiber 725 and the other material may migrate towards the outer surface of the fiber 730. In yet another embodiment shown in FIG. 7D, a polymer solution 705 and a functionalizing material 710 may be electrospun coaxially onto a target 720, where the materials may align coaxially as they are electrospun. In the embodiment of FIG. 7D, one of the materials may form the outer surface 730 of the nanofiber while the other material may form the center 725 of the nanofiber.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim 1s incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of manufacturing a plurality of personal protection equipment mask, comprising:
    providing a stock of polymer material;
    creating nanofibers from the stock polymer material to form a nanofiber material;
    placing the nanofiber material onto a plurality of convex molds; and
    cutting the nanofiber material to the shape of a plurality of personal protection equipment masks,
    wherein the nanofiber material of the personal protection equipment mask is functionalized to remove gas;
    wherein creating the nanofibers and placing the nanofiber material comprises electrospinning the polymer material onto the plurality of convex molds; and
    wherein the plurality of convex molds comprises at least one of each of the five standard face shapes.

2. The method of claim 1, wherein the nanofiber material comprises at least two different materials.

3. The method of claim 1, wherein the nanofiber material is further functionalized with one or more of a biocide, a virucide, or a bactericide.

4. The method of claim 1, wherein the nanofiber material of the personal protection equipment mask is functionalized to remove at least some volatile organic chemicals (VOCs) and acid vapors.

5. The method of claim 4, wherein the nanofiber material of the personal protection equipment mask is functionalized to remove at least one of: ozone ($O_3$), hydrogen cyanide (HCN), arsine ($AsH_3$), hydrogen fluoride (HF), chlorine dioxide ($ClO_2$), ethylene oxide ($C_2H_4O$), formaldehyde ($CH_2O$), methyl bromide ($CH_3Br$), and phosphine ($PH_3$).

6. The method of claim 5, wherein the nanofibers are further functionalized for one or more of the following: removing humidity, controlling temperature, indicating end-of-service-life, or providing fresh odor inside the plurality of masks.

7. The method of claim 1, wherein providing the stock of polymer material comprises providing the stock of polymer material homogeneously mixed with functionalizing material.

8. A method of manufacturing a plurality of personal protection equipment masks, comprising:
   unwinding inner shell moldable material;
   unwinding outer shell moldable material;
   thermoforming outer and inner shells of a personal protection equipment mask from the outer shell moldable material and the inner shell moldable material respectively,
      wherein forming the outer and inner shells comprises thermoforming an inner and an outer shell corresponding to each of the five standard face shapes;
   electrospinning a polymer material as nanofibers onto a surface of the inner shell;
   electrospinning a polymer material as nanofibers onto a surface of the outer shell;
   coupling the outer shell to the inner shell to form the personal protection equipment mask; and
   forming the plurality of personal protection equipment masks using the thermoformed outer and inner shells each having nanofibers electrospun thereon, wherein the plurality of personal protection equipment masks comprises at least one mask for each of the five standard face shapes,
   wherein the polymer material is functionalized to remove at least one of a volatile organic chemical (VOC) gas or an acid gas; and
   wherein the nanofibers on the inner shell and the nanofibers on the outer shell are both located between the inner and outer shells.

9. The method of claim 8 wherein the nanofibers on the outer shell differ in material from the nanofibers on the inner shell.

10. The method of claim 8, wherein the thermoformed inner and outer shells each comprise a corresponding shape of a human face.

11. The method of claim 8, wherein the polymer material is functionalized to remove at least one of: ozone ($O_3$), hydrogen cyanide (HCN), arsine ($AsH_3$), hydrogen fluoride (HF), chlorine dioxide ($ClO_2$), ethylene oxide ($C_2H_4O$), formaldehyde ($CH_2O$), methyl bromide ($CH_3Br$), and phosphine ($PH_3$).

12. The method of claim 8, wherein the nanofibers are functionalized with at least one of a biocide, a virucide, or a bactericide.

13. The method of claim 8, wherein the plurality of personal protection equipment masks are flat fold masks; the method further comprising:
   cutting the inner shell to form a shape of a flat fold mask, wherein the cutting allows for folding of the mask at nose and chin areas; and
   cutting the outer shell to form a shape that corresponds to the flat fold mask shape of the inner shell.

14. A method of manufacturing a plurality of personal protection equipment masks, comprising:
   electrospinning a material as nanofibers onto a plurality of molded form cover layers of polypropylene or polyethylene to form filtering media for at least a portion of the plurality of personal protection equipment masks, wherein the nanofibers are functionalized to remove gas;
   welding the nanofiber filtering media to the molded form cover layer; and
   forming the personal protection equipment masks into at least one of each of the five standard face shapes;
   wherein the material that is electrospun into nanofibers comprises a polymer and one or more functionalizing materials.

15. The method of claim 14, further comprising automatically visually inspecting the personal protection equipment mask using a camera control system to automatically detect defects.

16. The method of claim 14, wherein the one or more functionalizing materials are one or more chemicals that capture one or more of volatile organic chemicals (VOCs) and acid vapors, and one or more chemicals that capture one or more of hydrogen fluoride and ozone.

17. The method of claim 14, wherein the one or more functionalizing materials are one or more of a biocide, a virucide, or a bactericide.

18. The method of claim 14, wherein the material is a homogenous mix of the polymer and the functionalizing materials.

19. The method of claim 14, wherein the material comprises the functionalizing materials emulsified in the polymer.

* * * * *